United States Patent Office 3,439,064
Patented Apr. 15, 1969

3,439,064
LAMINATING VARNISH CONSISTING OF LOW VISCOSITY, CURABLE BLOCK COPOLYMER
Henry S. Makowski, Scotch Plains, and Merrill Lynn, Elizabeth, N.J., assignors to Esso Research and Engineering Company, a corporation of Delaware
No Drawing. Filed Jan. 11, 1965, Ser. No. 424,829
Int. Cl. C08d 3/02; C08f 1/56, 15/04
U.S. Cl. 260—879                                        5 Claims

ABSTRACT OF THE DISCLOSURE

A non-blocking, low viscosity, heat curable block copolymer having the configuration A–B wherein A is a polymer block of one $C_4$–$C_8$ conjugated diolefin and B is a polymer block of one vinyl compound chosen from the group consisting of styrene, x-methyl styrene, para-methyl styrene, 3,4-dimethyl styrene, acrylonitrile, methyl methacrylate and vinyl chloride, which copolymer composition has particular utility as a laminating varnish.

---

This invention relates to laminating varnishes comprising block copolymers of conjugated dienes and vinylic compounds and more particularly relates to such a varnish which is particularly suitable for dry laminate lay-up operations in which a solution of a resin is applied to a reinforcing element and cured to a tough, strong product.

It is known to prepare varnishes suitable for laminating operations by polymerizing conjugated diolefins or copolymerizing them with other monomers such as vinyl aromatic hydrocarbons, e.g. styrene, and then grafting this resin with additional monomer, e.g. vinyl toluene or divinyl benzene, to form a resin which is then applied via an impregnating solution of the resin to a reinforcing element such as glass fibers to form "pre-pregs," a number of which can be stacked one upon the other, and the stack subjected to heat and pressure resulting in a cured laminate. Such a process is described in U.S. Patent No. 3,079,295, issued Feb. 26, 1963, to O. C. Slotterbeck et al.

In carrying out such operations it is desirable that the laminating varnish have a low viscosity, otherwise the varnish will not properly impregnate the web of reinforcing element. If a high viscosity resin is diluted with additional solvent, the solids content of the resulting solution is often so low that it is difficult to achieve the proper resin content of the impregnated web in a single operation. Double impregnations are undesirably expensive.

It is further desirable that the laminating varnish be such that when a web of reinforcing element is impregnated with the varnish and a plurality of such webs rolled or stacked one upon another in storage or in transit the impregnated webs do not block and may be separated with substantially no effort. This is often not the case with the prior art varnishes.

Another desideratum is that such a varnish should be simple to manufacture. In the process of U.S. No. 3,079,-295 it is necessary to provide a second step in which an additional crosslinking monomer, such as vinyl toluene and/or divinyl benzene, is reacted with the basic resin. This results in process and economic disadvantages and should be avoided, if possible.

In accordance with the present invention, the above and other disadvantages are overcome by providing a novel laminating varnish resin which has certain critical characteristics.

One important characteristic of the resin of this invention is that it is non-blocking. A non-blocking polymer is defined as a material which when deposited upon a glass cloth substrate to levels of from 25 to 50 weight percent and the impregnated glass cloth pressed upon itself under a pressure of 1½ pounds per square inch for a period of five minutes will be pulled apart by a force of less than 50 grams per inch when pulled at an angle of 180° at a crosshead speed of fifty inches per minutes. It will be recognized that those resins which have no tendency to block under the above test conditions, i.e., to have a peel strength of 0 p.s.i., are the best suited. However, those products having peel strengths of up to 50 grams per inch operate satisfactorily.

Another important characteristic of the resin used in this invention is that the varnish, i.e. the solution of the resin, have a sufficiently low viscosity so as to contain a resin concentration of 40 to 75 weight percent, preferably 50 to 65 weight percent, and have a viscosity of from 0.5 to 30 stokes, preferably 1 to 5 stokes.

A further characteristic of the varnish of this invention is that it cure to a hard tough product at 320° F. within thirty minutes. Higher temperatures can be used but are unnecessary. A cure temperature of 320° F. is particularly suitable since this is the temperature easily achieved in steam-heated presses. Electrically- or oil-heated presses are considerably more expensive to operate.

The copolymer of this invention must be a block-copolymer as distinguished from a random copolymer since random copolymers of the compositions described below are tacky or elastomeric.

A particularly important characteristic of the conjugated diolefin component of the resin of this invention is that at least 50 mole percent and preferably above 75 mole percent of the diolefin of the copolymer be introduced via 1,2- or 3,4-addition during copolymerization, as opposed to 1,4-addition.

The resin of this invention is simple to prepare in a one-step method, avoiding the step of forming a graft polymer and the use of a difunctional crosslinking agent, such as divinyl benzene.

Thus, the impregnating solution of the present invention is characterized by:

(1) Forming non-blocking "pre-pregs,"
(2) Containing at least 40 weight percent resin and having a viscosity between 0.5 and 30 stokes.
(3) The "pre-preg" curing to a hard, tough product as measuerd by its Rockwell hardness,
(4) The resin containing between 15 and 40 mole percent of a vinyl compound,
(5) The resin being a block copolymer having the configuration A–B wherein A is a polymer block of one $C_4$–$C_8$ conjugated diolefin (such as butadiene-1,3) and B is a polymer block of one vinyl compound chosen from the group consisting of styrene, α-methyl styrene, para-methyl styrene, 3,4-dimethyl styrene, acrylonitrile, methyl methacrylate and vinyl chloride,
(6) At least 50 mole percent of the conjugated diolefin moiety of the block copolymer being introduced during copolymerization via a 1,2- or 3,4-addition.

The above resin characteristics are obtained by the copolymerization of a conjugated diolefin and a vinylic compound to the proper degree of polymerization in suitable hydrocarbon diluents with an organo-lithium catalyst in the presence of cocatalysts. If the polymerization is conducted in the absence of cocatalyst, resins are obtained which cannot be adequately cured.

Laminating varnish resins which are obtained from polymerizations conducted in the presence of suitable cocatalysts cure rapidly under the previously stated conditions to hard, tough products. Cocatalysts well suited for this invention are amines, diamines, polyamines, ethers, polyethers, cyclic ethers, thioethers, polythioethers, cyclic thioethers, etc. Specific examples of these cocatalysts are pyridine, triethylamine, dimethyl aniline, ethyl ether, butyl ether, diphenyl ether, tetrahydrofuran, tetrahydropyran, m- and p-dioxane, 1,1-dimethoxy ethane, the dialkyl ethers of ethylene glycol, such as 1,2-dimethoxy ethane, tetrahydrothiophene, 3,6-dithiaoctane, tetraalkyl ethylene diamine and derivatives of these. The ratio of cocatalyst to catalyst depends upon the structure and properties of the particular cocatalyst, varying from 0.1 to 50 moles cocatalyst/mole catalyst. Higher ratios can be used but it has been found, surprisingly, that undesirable side reactions usually occur at these higher ratios, resulting in products which are very poor in quality and which are not useful as laminating varnish resins. An example of a good practical cocatalyst is tetrahydrofuran which can be used at ratios of from one mole per mole of catalyst to 50 moles per mole of catalyst at room temperature, but ratios of 3/1 to 20/1 are preferred.

The method of introduceding the monomers during the polymerization is critical. Random polymerization or introduction of monomers simultaneously gives an unsatisfactory product. Such a product is elastomeric even at relatively high vinylic olefin contents where cure rates are lower. On the other hand the block copolymerization of the monomers produces satisfactory products. By "block" copolymerization is meant the formation of a copolymer made up of comparatively long sections derived from one monomer followed by segments derived from different monomers, as for example blocks of polybutadiene separated by blocks of polystyrene. Such a copolymer is produced by the alternate introduction of each of the monomers to the reaction zone.

The diluent for the polymerization reaction is preferably an aromatic hydrocarbon such as benzene, toluene, xylene, alkyl benzenes, chlorobenzenes and the like. Aliphatic diluents, such as hexane and heptane, can be used but are less desirable due to limited solubility of the conjugated diolefin-vinylic olefin copolymers. In general, any diluent which will not coreact with the organo-lithium during the course of polymerization may be used. Preferably, the diluent will be one that will later serve as the vehicle for the impregnating resin, for example, toluene. At the completion of the polymerization reaction, the catalyst is inactivated with water, alcohols or other agents and the copolymer solution is washed with water to remove the inorganic residue and some of the cocatalyst, depending on the nature of the cocatalyst. Agents useful for catalyst deactivation are water and alcohols, such as methanol, ethanol, isopropanol, n-hexanol, benzyl alcohol, and the like. Acids or acidic salts may also be used in the wash solution. Alternatively, the solution of the resin either before or after inactivation may be contacted, for example by percolation, with an acid ion-exchange resin to remove the catalysts. Suitable resins available commercially are Dowex-50X-8 (a strongly acidic cation exchange resin made by the nuclear sulfonation of styrene-divinylbenzene beads) and Amberlyst 15 (a strongly acidic macroreticular phenol-formaldehyde resin in bead form which is insoluble in non-polar solvents).

The removal of catalyst residues by water washing can be accomplished by thoroughly agitating a mixture of water and polymer solution at a water/solution volume ratio of from 0.1 to 10. Normally, one water washing is sufficient but more washings can be effected. The remainder of the cocatalyst, and any remaining water, are removed by distillation and/or azetropic distillation with the diluent. The distillation is continued until the copolymer concentration desired for the impregnating solution has been reached, and the solution is given a polish filtration. Other techniques for the removal of the inorganic residue, such as filtration through wet clay or addition of alcohol followed by filtration or addition of acids followed by filtration, may also be used with subsequent distillatin to remove the cocatalyst and to give the desired solids content. The resin crosslinking catalyst is then added to the resin solution along with other additives that may be needed for the impregnating solution.

Clay treatment or clay neutralization is also an effective means of deactivating the catalyst and removing the lithium residues. This process offers a simpler and faster alternative route to the deactivation, water washing and azeotroping steps described above. In this process the reaction mixture is contacted with a mineral type clay to effect the removal of the lithium residues. This may be done by passing the reaction mixture through a bed of clay or by adding the clay to the reaction mixture, then filtering the mixture after it has been contacted for an appropriate length of time.

Examples of mineral clays useful in this process are attapulgite, virmiculite, montmorillonite and the like. The effectiveness of a particular clay will depend upon its moisture content or hydration state, particle size, porosity and ion exchange capacity. The moisture content of the clay is the most important variable in the removal of the lithium, and the amount of clay used depends upon its moisture content. For this process the moisture content is taken to be the water held by the clay material at relatively low temperatures. (See: Grim, Ralph E., "Clay Mineralogy," chap. 8, McGraw-Hill, 1953.) This water is determined by the loss in weight on heating the clay in a vacuum oven for one hour at 190° C.

In theory it should take approximately 2.6 grams of this water to remove one gram of the lithium, but in practice it has been found that excellent results are obtained when a ratio of 4 grams of water associated with the clay (determined as above) is used for each gram of lithium. It is also recognized that the contact time between the clay and the reaction mixture can be lowered as this ratio is increased. The impregnating varnish solutions worked up in this manner contained less than one part of lithium per million parts of resin.

The organo-lithium catalyst has the general structure:

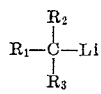

where $R_1$, $R_2$, and $R_3$ are selected from the group consisting of hydrogen, an acyclic radial such as methyl, ethyl, propyl, t-butyl, etc., up to $C_{20}$, or alicyclic radicals of from $C_5$ to $C_{12}$ and aromatic radicals of from $C_6$ to $C_{12}$ such as phenyl, tolyl, benzyl, naphthyl, polyalkyl phenyl such as xylyl, etc.

Conjugated diolefins particularly useful in this invention are those which have from 4 to 8 carbon atoms per molecule, e.g. 1,3-butadiene, isoprene, piperylene, 2,3-dimethyl-1,3-butadiene, 1,3-hexadiene, 2,4-hexadiene, octadiene, cyclopentadiene, myrcene, allo-ocimene, etc. Examples of vinylic compounds useful in this invention are vinylic hydrocarbons such as styrene, α-methyl styrene, and styrenes having alkyl groups substituted on the ring, e.g. paramethyl styrene and 3,4-dimethyl styrene and substituted olefins such as acrylonitrile, methyl methacrylate, vinyl chloride, etc.

The pressure at which polymerization is conducted may vary from below atmospheric (0.1 atmosphere) to 100 atmospheres, preferably 1 atmosphere to 10 atmospheres. The temperature at which polymerization is conducted may vary from —70° C. to 100° C., preferably 0° C. to 60° C.

The preparation of the copolymers is effected by the gradual addition of monomers to a solution of the catalyst and cocatalyst at a controlled temperature. In a batch process all of the monomer is preferably not added in a single charge since (1), the polymerization becomes too vigorous and causes excessive temperatures which yield products having undesirable properties, and (2) one monomer must be completely reacted before the other is added in order to achieve the block structure required for useful laminating varnish resins.

The rate of monomer addition is a critical feature of the invention not only because of temperature control but also because, surprisingly, it has been found that the rate of monomer addition has a marked influence on the solution viscosity properties and product quality. By controlling the rate of monomer addition, one can obtain products whose solution viscosities vary quite widely, even though the molecular weight and the percentage of olefin in the polymer are the same.

It has been found that acceptable laminating varnish resins are obtained when the monomers are added over a period of up to two hours, while maintaining the temperature between 0 to 60° C., preferably between 15 to 50° C. If the monomers are added over a period exceeding two hours, laminating varnish resins are obtained which are frequently tacky and whose solutions have excessively high viscosities, or, in some instances, are milky and non-homogeneous. At monomer addition times of up to two hours, the laminating varnish solutions are clear, homogeneous and low in viscosity. It has been found that good temperature control can be maintained when the monomers are added over a period of fifteen minutes or more. Copolymerizations are best effected by adding the monomers over periods of from thirty minutes to two hours. Under these conditions both temperature and product quality are controllable.

Since the concentration of polymer in diluent will increase with increasing monomer addition in batch processes, it is preferred to maintain the concentration of monomer at from 1 to 50% by weight, preferably 10 to 30% by weight. Too low concentrations are impractical, while too high concentrations result in more viscous solutions resulting in poor heat transfer during polymerization.

It should be pointed out that in batch processes only the time of monomer addition is critical at a given temperature once the catalyst and cocatalyst are contacted. Residence time after monomer addition is completed has no effect on copolymer properties.

The resin of this invention cures to a hard, tough product as measured by its hardness, a Rockwell F of 65 or above, within fifteen minutes at 285° F. when using type 181 glass cloth as the substrate and the "pre-preg" contains 20% to 40% by weight of resin. Homopolymers of conjugated dienes prepared by the method described below can be readily cured at temperatures which are satisfactory for this invention. However, conjugated diolefin homopolymers having satisfactory solution and cure properties are not solids, and the "pre-pregs" prepared therefrom block readily. Copolymers of conjugated diolefins with vinylic compounds such as styrene, α-methyl styrene and the like yield solid products, but an increase in the vinylic component content results in a proportionate decrease in the rate of cure. Therefore, the vinyl compound content of the copolymer should lie between 15 and 40 mole percent as shown below.

The number average molecular weights of the copolymers of this invention as determined from kinetic data derived from the ratio of moles of monomer to moles of catalyst should be 3,000 to 30,000, preferably 5,000 to 15,000. The proportions of conjugated diolefin and vinylic compound in the copolymer are from fifteen parts vinylic compound/85 parts conjugated diolefin to 60 parts vinylic compound/40 parts conjugated diolefin, preferably 20 parts vinylic compound/80 parts conjugated diolefin to 40 parts vinylic compound/60 parts conjugated diolefin.

In the preparation of a laminate, a solution of the polymer and curing agent is applied to the web of reinforcing element and the solvent removed, leaving the web impregnated with resin and catalyst.

The curing agent is incorporated in the impregnating solution within the range of 0.1 to 10 parts, preferably 0.2 to 5 parts, based on the resin (100% NVM). The curing agent is a free radical initiator, for example peroxides such as dialkyl, arylalkyl or diaryl peroxides, e.g. dicumyl peroxide, 2,6-dimethyl-2,5-di-t-butyl peroxy hexane and di-t-butyl peroxide; diacyl peroxides, e.g. benzoyl peroxide, lauroyl peroxide; alkyl peresters, e.g. di-t-butyl perphthalate and t-butyl perpenzoate; etc. Preferred catalysts are dicumyl peroxide and 2,5-dimethyl-2,5-di-t-butyl peroxy hexane which are stable and non-volatile under the normal conditions for drying the "pre-preg." Normal conditions are 200° to 250° F. at atmospheric pressure in an air circulating oven. Lower drying temperatures, e.g. 70° F. are possible by drying in a vacuum oven, in which case peroxides having lower decomposition or half-life temperatures may be employed. Suitable peroxides and their decomposition temperatures and half-lives are given by Doehnert and Mageli in "Modern Plastics" 6, 142 (1959) and in Bulletin 30.30 published by Wallace and Tiernan, Lucidol Division, Buffalo, N.Y.

In certain cases it has proved advantageous to also include in the impregnating solution 0.1 to 5 parts of a substituted silane per 100 parts of resin (100% NVM), of the general formula $R_nSiX_{4-n}$, where R is selected from the group consisting of alkyl, aryl, alkoxy, vinyl, allyl, aminoalkyl, hydroxy, alkylamino and the like; $n$ is an integer equal to 1, 2, or 3; and X is halogen or an OR' where R' is an alkyl or aryl group. Useful examples are: vinyltrimethoxysilane, vinyltriethoxysilane, methacryloxypropyltrimethoxysilane, amino - propyltriethoxysilane, N,N-bis(hydroxyethyl)-aminopropyltriethoxysilane and glycidoxypropyltrimethoxysilane and vinyl trichlorosilane.

The reinforcing elements that can be laminated with the described resins include organic materials, e.g. cellulosics such as cotton, rayon and paper, synthetics such as polyolefins, polyamides, polyacrylics, polyesters, polyureas, polyurethanes and natural fibers such as silk, linen, ramie, jute, hemp and sisal; metallic materials, e.g. aluminum, copper and iron; and mineral materials, e.g. glass and asbestos. The preferred materials are polyolefins, paper and glass fiber and cloth. The glass fibers include yarn, woven fabrics, mats, etc., including glass fibers treated with organic halo-silane compounds. If paper is used as the reinforcing element it can be pre-treated with 5 to 15% of a thermosetting resin, e.g. phenolic and melamine resins. The reinforcing element may comprise 10 to 90% by weight of the laminate, preferably 30 to 80%. Impregnation can be accomplished by any known method, e.g. immersion of the web in the impregnating solution, transfer roll printing, spraying or brushing the impregnating solution on the web.

The impregnated web is dried in an air circulating oven at temperatures of 70° F. to 285° F. for thirty seconds to two hours, e.g. four minutes at 250° F. The "pre-preg" can then be laminated or it can be prepared for storage or shipment by winding onto rolls.

The laminates are formed by stacking the impregnated webs to the desired thickness and orientation, then heating the stacked "pre-pregs" under pressure. The pressures useful in this invention range from 50 p.s.i. to 3000 p.s.i. with 100 p.s.i. to 1500 p.s.i. preferred.

The laminates cure to give hard, tough materials in open molds by heating at temperatures of 280° F. to 400° F. with pressures of 50 p.s.i. to 3000 p.s.i. for thirty seconds to one hour. Complete cures can be accomplished by heating the impregnated webs in a mold at a temperature between 280° F. and 320° F. for five minutes to one hour, e.g. five minutes at 300° F.

The cured laminates not only possess excellent mechanical properties, but also possess outstanding electrical properties.

The following examples are submitted to illustrate but not to limit this invention.

EXAMPLE 1

A high 1,2-addition polybutadiene was prepared in the following manner: A 5 l. flask was charged under $N_2$ with 2.4 l. of sodium dried n-heptane, 72 grams (1.0 mole) of purified, anhydrous, peroxide-free tetrahydrofuran and 6.4 grams (0.1 mole) of n-butyl lithium. 1,3-butadiene was slowly added to the stirred catalyst solution while maintaining the temperature between 25 to 30° C. until a total of 20 moles had been added. The solution was stirred for twenty hours, and then the lithium catalyst was destroyed by the addition of excess water to the reaction mixture. The reaction mixture was washed with water until the washings were neutral, dried over anhydrous MgSO$_4$ and stripped under reduced pressure to remove the solvent. Total stripping was effected to examine the base polymer. A 90% yield of a clear, tacky, semi-solid was obtained. An impregnating solution was prepared with the resin as follows:

|  | Parts |
|---|---|
| Resin | 100 |
| Toluene | 82 |
| Dicumyl peroxide | 5 |
| Vinyl tris(2-methoxyethoxysilane) | 0.6 |

The solution had a Gardner viscosity of 3.10 stokes.

A "pre-preg" was prepared using heat cleaned type 181 glass cloth by passing the glass cloth through the solution, then through doctor blades to remove the excess resin solution. The doctor blades were adjusted so as to provide the desired resin pick-up. The wetted glass cloth was dried in an air circulating oven at 250° F. for four minutes and cooled. The resultant "pre-preg" was very tacky and blocked readily and had a peel strength of 142 grams per inch when tested according to the block test described previously. Four plies of the "pre-preg" were laminated and cured for five minutes at 320° F. under a pressure of 300 p.s.i. The laminate was excellent in appearance and had a Rockwell F hardness of 68.

It is clear from this example that although the polybutadiene resin had excellent solution and cure properties, nonetheless the "pre-pregs" were very tacky and blocked readily. The tack and blocking characteristics of this resin make it undesirable for use in a commercial dry laminate lay-up operations.

EXAMPLES 2 TO 13

Butadiene-styrene block copolymers containing varying amounts of styrene (5 mole percent to 60 mole percent) were prepared in the following manner. This series of copolymers was prepared in a stepwise manner by first polymerizing the butadiene as in Example 1, followed by the block polymerization of the styrene onto the polybutadiene. In all the examples listed the polymers were first recovered in order to examine the physical properties of the resin itself as well as the properties of the "pre-preg" and the laminates.

A 2 l. flask was charged under N$_2$ with 1 l. of dry toluene, 21 ml. of the same purified tetrahydrofuran and 0.025 mole of butyl lithium. 1,3-butadiene was added to the stirred catalyst solution over periods of eighteen minutes to forty-five minutes at a temperature of 28±3° C., until the desired amount of butadiene had been added. Thereafter styrene was added over periods of ninety minutes to twenty minutes until the desired amount of styrene had been added. In all cases the mole ratio of total monomers to alkyl lithium was 200 to 1. Stirring was continued for thirteen to eighteen hours after the addition of the styrene. The copolymers were isolated by precipitating with methanol in a Waring Blendor, followed by two washings with methanol which contained a small amount of 2,6-di-t-butyl-p-cresol as oxidation inhibitor, then filtering and drying in a vacuum oven at 40° C. for approximately sixteen hours. The yields ranged from 95% to quantitative. All of the products were white in color, the products with low styrene contents being tacky semi-solids, while those with high styrene contents were free-flowing solids. The physical appearance of the copolymers is listed in Table I.

TABLE I.—BLOCK CHARACTERISTICS OF BUTADIENE STYRENE-COPOLYMERS

| Example No. | Mole percent styrene in resin | Physical appearance of resin | Tack in pre-preg visual observation | Block characteristics strength, g. per inch |
|---|---|---|---|---|
| 2 | 5 | Tacky semi-solid | Very tacky | 168 |
| 3 | 10 | do | do | 283 |
| 4 | 15 | Slightly tacky, rubbery solid | Slightly tacky | 23 |
| 5 | 20 | Rubbery solid | Very slight tack | 0 |
| 6 | 25 | Free-flowing solid | do | 0 |
| 7 | 30 | do | Tack free | 0 |
| 8 | 35 | do | do | 0 |
| 9 | 40 | do | do | 0 |
| 10 | 45 | do | do | 0 |
| 11 | 50 | do | do | 0 |
| 12 | 55 | do | do | 0 |
| 13 | 60 | do | do | 0 |

TABLE II.—HARDNESS OF LAMINATES PREPARED FROM BUTADIENE-STYRENE RESINS
[Cured 15 minutes at 285° F.]

| Examples | Mole percent styrene | Viscosity-stokes 55% solution in toluene | Wt. percent resin in pre-preg | Rockwell F |
|---|---|---|---|---|
| 2 | 5 |  | 30 | 87 |
| 3 | 10 | 4.60 | 38 | 94 |
| 4 | 15 | 4.80 | 38 | 94 |
| 5 | 20 |  | 37 | 88 |
| 6 | 25 | 4.70 | 37 | 90 |
| 8 | 35 |  | 28 | 81 |
| 9 | 40 |  | 30 | 80 |
| 10 | 45 |  | 37 | 71 |
| 11 | 50 |  | 32 | 65 |
| 12 | 55 | 11.8 | 34 | 69 |
| 13 | 60 | 11.4 | 35 | 64 |

Clear free-flowing impregnating solutions were prepared using the formulation given in Example 1, and the solutions were used to impregnate heat cleaned type 181 glass cloth. The glass cloth was impregnated and dried in the same manner as described in Example 1. The "pre-pregs" ranged from very tacky for the 5 mole percent styrene resin to tack-free for the 30 mole percent and up, and ranged from blocking for the 5 to 15 mole percent to non-blocking for those resins with higher styrene contents. The tack and blocking characteristics are listed in Table I. Four plies of the "pre-pregs" were laminated and cured at 285° F. for fifteen minutes under a pressure of 300 p.s.i. for those resins containing less than 40 mole percent styrene and under a pressure of 1100 p.s.i. for those resins containing 40 mole percent styrene or greater. In each case laminates excellent in appearance were obtained. The Rockwell F hardnesses of the laminates and the viscosities of 55 wt. percent solutions used in preparing the "pre-pregs" are listed in Table II.

Although the resins containing 5 and 10 mole percent styrene had excellent solution and cure properties the "pre-pregs" made from these resins were tacky and blocked easily, making them undesirable for use in commercial dry laminate lay-up operations. These examples also illustrate that even though styrene contents up to 60 mole percent are still useful the most desirable resins are those containing 40 mole percent or less styrene. Thus, the most useful resins, i.e. those having the proper balance of blocking characteristics and cure rate, are those containing between 15 and 40 mole percent styrene.

EXAMPLE 14

The copolymer desired in this case was a butadiene-styrene block copolymer with 30 mole percent styrene. Again, the ratio of monomer to alkyl lithium was 200 moles to 1 mole. The polymerization procedure was similar to that described in Example 2 with the exception of the amounts of material used. The recovery procedure for the polymer was also the same as that described in Example 2. A 94% yield of a white, granular free-flowing solid was obtained. Analysis of this product by NMR showed it to be a block-copolymer containing 28 mole percent styrene.

Two impregnating solutions were prepared from this resin as follows:

Solution A

| | Parts |
|---|---|
| Resin | 100 |
| Toluene | 82 |
| Dicumyl peroxide | 5 |
| Vinyl tris(2-methoxy ethoxy)silane | 0.6 |

Solution B

| | |
|---|---|
| Resin | 100 |
| Toluene | 82 |
| Bis(t-butyl peroxy isopropyl)benzene | 5 |
| Vinyl tris(2-methoxy ethoxy)silane | 0.6 |

Both solutions had a Gardner viscosity of 5.7 stokes.

"Pre-pregs" were prepared from these solutions as described in Example 1. Solution A was used to impregnate heat cleaned type 181 glass cloth and phenolic treated paper (containing 12% phenolic resin by weight). The pre-pregs were tack-free and were non-blocking. Two 8-ply laminates were prepared from the glass cloth with cure cycles of 335° F. and 370° F. for thirty minutes under a pressure of 300 p.s.i. A 7-ply laminate was prepared from the paper with a cure cycle of 335° F. for thirty minutes under a pressure of 300 p.s.i. All the laminates were excellent in appearance.

Solution B was used to impregnate heat cleaned type 181 glass cloth, type 1528 glass cloth and melamine treated paper. These pre-pregs were also tack-free and non-blocking. Eight ply laminates were prepared from the glass cloths and a seven ply laminate was prepared from the melamine treated paper with a cure cycle of 335° F. for thirty minutes under a pressure of 300 p.s.i. All of these laminates were excellent in appearance.

Pre-preg resin contents, drying conditions, curing and laminating conditions and properties of the laminates prepared above are given in Table III.

This example shows—(1) the use of a 30 mole percent styrene copolymer as a laminating varnish resin for both glass cloth and paper substrates; (2) the use of higher cure temperatures (335° F. and 370° F.) and a different peroxide catalyst; bis(t-butyl peroxy isopropyl) benzene; (3) laminates prepared from the butadiene-styrene resin have excellent mechanical properties and outstanding electrical properties.

EXAMPLE 15

A butadiene-styrene block copolymer containing 20 mole percent styrene was prepared at a ratio of 300 moles of monomer per mole of alkyl lithium. The polymerization and isolation procedures were similar to those described in Example 2. The product was a white, slightly rubbery solid. An impregnating solution prepared from this resin was used to impregnate heat cleaned type 181 glass cloth and phenolic treated paper (12% by weight phenolic).

The glass cloth pre-preg contained 36.6% resin by weight. It was only very slightly tacky and was non-blocking. Eight ply of the pre-preg were laminated and cured by heating at 320° F. for thirty minutes under a pressure of 300 p.s.i. An excellent laminate was produced which had a Barcol hardness of 58, a flexural strength at room temperature of 52,400 p.s.i., and the following electrical properties at room temperature: Dielectric constant 4.35; dissipation factor 0.00306; loss factor 0.0133.

The pretreated paper pre-preg had a total resin content of 60.0% by weight. The pre-preg was only slightly tacky and was non-blocking. Seven ply of the pre-preg were laminated and cured by heating to 335° F. for thirty minutes under 300 p.s.i. pressure. An excellent laminate was produced having a room temperature flexural strength of 13,040 p.s.i. and the following electrical properties at room temperature: Dielectric constant 3.60; dissipation factor 0.0202; loss factor 0.0727.

This example illustrates that higher molecular weight copolymers (about 20,000) are useful as laminating varnishes.

EXAMPLE 16

A butadiene-styrene block copolymer containing 30 mole percent styrene was prepared at a ratio of 100 moles of monomer per mole of alkyl lithium. The preparation procedure was similar to that described in Example 2. The product was a tough, white solid. An impregnating solution prepared according to the recipe given in Example 1 had a Gardner viscosity of 0.75 stoke. A pre-preg was prepared from this solution using melamine pretreated paper as the substrate. The pretreated paper was impregnated and dried as described in Example 1. The pre-preg was non-tacky and non-blocking. Seven ply of the pre-preg were laminated and cured by heating to 335° F. for thirty minutes under 300 p.s.i. pressure. An excellent laminate was obtained having a Barcol hardness of 52 and a room temperature flexural strength of 17,800 p.s.i. It had the following electrical properties: Dielectric constant 4.10; dissipation factor 0.0307; loss factor 0.126.

TABLE III

| | Solution | | | | | |
|---|---|---|---|---|---|---|
| | A | | | B | | |
| Substrate | Heat cleaned 181 glass cloth | Heat cleaned 181 glass cloth | Phenolic paper | Heat cleaned 181 glass cloth | 1528 glass cloth | Melamine paper |
| Drying, min./° F | 4/250 | 4/250 | 4/250 | 4/250 | 4/250 | 4/250 |
| Wt. percent solvent-free resin in pre-preg | 37.4 | 39.8 | 59.4 | 39.2 | 38.3 | 60:0 |
| Lamination: | | | | | | |
| Cure, min./° F | 30/335 | 30/370 | 30/335 | 30/335 | 30/335 | 30/335 |
| Pressure, p.s.i | 300 | 300 | 300 | 300 | 300 | 300 |
| Laminate properties: | | | | | | |
| Barcol hardness | 69 | 68 | 52 | 72 | 70 | 54 |
| R.T. flex. strength, p.s.i | 55,900 | 54,050 | 12,400 | 54,200 | 38,550 | 14,700 |
| Dielectric constant, K | 5.08 | 4.94 | 3.72 | 4.49 | 4.21 | 4.17 |
| Dissipation factor, D | 0.00258 | 0.00263 | 0.0201 | 0.00291 | 0.00317 | 0.0109 |
| Loss factor (K×D) | 0.0131 | 0.0130 | 0.0248 | 0.0131 | 0.0133 | 0.0455 |

This example illustrates (1) the utility of a styrene block copolymer of relatively low molecular weight as a laminating varnish; and (2) the effect of the molecular weight of the resin on solution viscosity.

EXAMPLES 17–18

Two butadiene-styrene copolymers were prepared with 40 mole percent styrene at a ratio of 160 moles of monomer per mole of alkyl lithium. One was a block copolymer prepared according to the procedure given in Example 2 and the other was a random copolymer prepared by adding the two monomers simultaneously to the reaction mixture. The block copolymer was a non-tacky, non-rubbery, free-flowing solid while the random copolymer was a tacky, rubbery, semi-solid. Pre-pregs obtained from the block copolymer using silane treated glass cloth as the substrate were completely free of tack and were non-blocking, while pre-pregs obtained from the random copolymer using the same substrate were slightly tacky but blocking.

Laminates prepared from both resins were excellent in appearance. Both resins cured at 335° F. for thirty minutes to give laminates of comparable hardness and flexural strength. This illustrates that the random copolymers can be cured to give laminates with excellent properties but they are undesirable because of the blocking characteristics of the pre-pregs.

EXAMPLES 19–26

In this series of examples, the polymerization temperature, the THF/butyl lithium ratio, and total time of monomer addition were examined to note their effects on copolymer solution properties.

Block copolymerizations were effected as previously described in toluene diluent, at a final monomer concentration of 20 weight percent, at a monomer/butyl lithium molar ratio of 200, and at a butadiene/styrene molar ratio at 7/3.

The THF/butyl lithium ratios were 8/1 and 12/1. The polymerization temperatures were 25° C. and 40° C. The times of monomer addition were 70 minutes and 210 minutes.

The copolymer solutions were stirred for thirty minutes after complete monomer addition and then the copolymers were isolated by methanol precipitation, as previously described.

All copolymers prepared by short time of monomer addition were free-flowing solids, whereas all copolymers prepared by long time monomer addition were tacky, somewhat rubbery solids. The solution properties of the copolymers are given in Table IV.

TABLE IV

| Ex. | Time of monomer addition, minutes | Polymerization temperature, C. | THF/butyl lithium ratio | Gardner viscosity stokes (55% NVM in toluene) |
|---|---|---|---|---|
| 19 | 70 | 25 | 8/1 | 10.3 |
| 20 | 70 | 25 | 12/1 | 12.3 |
| 21 | 70 | 40 | 8/1 | 6.0 |
| 22 | 70 | 40 | 12/1 | 7.4 |
| 23 | 210 | 25 | 8/1 | (¹) |
| 24 | 210 | 25 | 12/1 | >286 |
| 25 | 210 | 40 | 8/1 | (¹) |
| 26 | 210 | 40 | 12/1 | (¹) |

¹ Two phase, milky.

All copolymers prepared with short time monomer addition (Examples 19–22) gave clear, water-white, free-flowing toluene solutions. The copolymers prepared with long time monomer addition gave either two phase, milky "solutions" (Examples 23, 25, and 26) or extremely thick "solutions" (Example 24). Even though the polymer of Example 24 gave a clear "solution" it was clearly non-homogeneous as indicated by striation during flow. Even in this state of incomplete solution, the viscosity was extremely high.

The effects of temperature and THF/butyl lithium ratio are clearly minor effects, although higher polymerization temperatures are slightly favored.

These examples illustrate dramatically the drastic effect of time of monomer addition on copolymer solution properties and quality. They also illustrate the use of temperatures of 25 and 40° C. and THF/butyl lithium ratios of 8/1 and 12/1.

EXAMPLE 27

A butadiene-styrene block copolymer containing 25 mole percent styrene was prepared at a ratio of 200 moles of monomer per mole of alkyl lithium. A total of 0.025 mole of n-butyl lithium was used for the polymerization which was similar to that described in Example 2.

The reaction was stirred for one hour after the monomer addition was completed, then 11 grams of Attapulgus clay containing 14.3% low temperature bound moisture were added. The mixture was stirred for twenty minutes, then was filtered through a thin layer of Celite. The resulting clear solution had a viscosity of 2.1 stokes when stripped to 50.7% solids.

Analysis of the product by flame photometry showed that it contained less than one part of lithium per million parts of polymer.

This example illustrates the utility of the clay neutralization or clay filtration process.

The nature of the present invention having been thus fully set forth, what is claimed as new and useful and desired to be secured by Letters Patent is:

1. A thermosetting non-volatile composition of matter suitable for forming reinforced laminates, consisting essentially of a block copolymer having a number average molecular weight of 3,000 to 30,000 and having the configuration A–B wherein A is a polymer block of one conjugated diolefin of 4 to 8 carbon atoms and B is present in an amount of 15 to 40 mole percent and is a polymer block of one vinyl compound chosen from the group consisting of styrene, alphamethyl styrene, paramethyl styrene, 3,4-dimethyl styrene, acrylonitrile, methyl methacrylate, and vinyl chloride, not more than 50 mole percent of the conjugated diolefin moiety of the copolymer being introduced via a 1,4 addition, said copolymer producing non-blocking pre-pregs, having a solution viscosity between 0.5 and 30 stokes at concentrations of 40 to 75 weight percent in toluene and curing to a hard, tough product when heated to 320° F. for thirty minutes.

2. The composition of claim 1 in which the conjugated diolefin is 1,3-butadiene and the vinyl compound is styrene.

3. The composition of claim 2 in which not more than 25% of the conjugated diolefin moiety of the copolymer is introduced via a 1,4 addition.

4. A method for preparing a laminating varnish of a thermosetting block copolymer having a number average molecular weight of 3,000 to 30,000 and a solution viscosity between 0.5 and 30 stokes at concentrations of 40 to 75 weight percent in toluene which comprises: (A) contacting initially one conjugated diolefin of 4 to 8 carbon atoms with (1) an organo lithium catalyst having the structure

where $R_1$, $R_2$, and $R_3$ are selected from the group consisting of hydrogen, acyclic radicals containing 1 to 20 carbon atoms, alicyclic radicals containing 5 to 12 carbon atoms and aromatic radicals containing 6 to 12 carbon atoms, (2) 1 to 50 moles, per mole of said organo lithium catalyst, of a cocatalyst selected from the group consisting of pyridine, triethylamine, dimethyl aniline, ethyl ether, butyl ether, diphenyl ether, tetrahydrofuran, tetrahydropyran, m- and p-dioxane, 1,1-dimethoxy ethane, 1,2-dimethoxy ethane, tetrahydrothiophene, 3,6-dithiaoctane, and tetraalkyl ethylene diamine, and (3) an aromatic hydrocarbon diluent chosen from the group consisting of benzene, toluene, xylene, alkyl benzenes, and chlorobenzenes, (B) after polymerization of substantially all of said diolefin present in step (A), contacting the reaction product of step (A) with one vinyl monomer selected from the group consisting of styrene, alpha-methyl styrene, paramethyl styrene, 3,4-dimethyl styrene, acrylonitrile, methyl methacrylate, and vinyl chloride; in each of steps (A) and (B) the monomers are added over a period of time not to exceed two hours while maintaining the temperature between 0 and 60° C.

5. The process of claim 4 in which the monomer contacted in step (A) is butadiene 1,3 and the monomer contacted in step (B) is styrene and the cocatalyst is tetrahydrofuran.

References Cited

UNITED STATES PATENTS

| | | | |
|---|---|---|---|
| 2,762,851 | 9/1956 | Gleason | 260—669 |
| 3,140,278 | 7/1964 | Kuntz | 260—879 XR |
| 3,078,254 | 2/1963 | Zelinski et al. | 260—880 |
| 3,239,478 | 3/1966 | Harlan | 260—880 XR |
| 3,251,905 | 5/1966 | Zelinski | 260—879 |

FOREIGN PATENTS 936,055   9/1963   Great Britain.

GEORGE F. LESMES, *Primary Examiner.*

K. E. KUFFNER, *Assistant Examiner.*

U.S. Cl. X.R.

156—334; 161—182, 203, 204, 205, 217, 227, 231, 249, 250, 251, 253, 255; 260—33.6, 683.1, 683.15, 827, 880